United States Patent
Schnitzer et al.

(10) Patent No.: US 8,939,468 B2
(45) Date of Patent: Jan. 27, 2015

(54) FIXING DEVICE FOR FIXING A STEERING SPINDLE BEARING UNIT

(75) Inventors: Rony Schnitzer, Ruggell (LI); Thomas Heitz, Mauren (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/980,959

(22) PCT Filed: Jan. 10, 2012

(86) PCT No.: PCT/EP2012/000071
§ 371 (c)(1),
(2), (4) Date: Jul. 22, 2013

(87) PCT Pub. No.: WO2012/100905
PCT Pub. Date: Aug. 2, 2012

(65) Prior Publication Data
US 2013/0298719 A1    Nov. 14, 2013

(30) Foreign Application Priority Data
Jan. 25, 2011    (DE) .......................... 10 2011 000 319

(51) Int. Cl.
*B62D 1/184*    (2006.01)
(52) U.S. Cl.
CPC ..................... *B62D 1/184* (2013.01)
USPC ............................ 280/775; 74/493
(58) Field of Classification Search
CPC ..................................... B62D 1/184
USPC .......................... 280/775; 74/493
See application file for complete search history.

(56) References Cited

U.S. PATENT DOCUMENTS

| 6,092,955 A * | 7/2000 | Chartrain et al. ............. 403/283 |
| 6,095,012 A | 8/2000 | Lutz |
| 7,735,391 B2 * | 6/2010 | Osawa et al. .................... 74/493 |
| 2004/0134301 A1 * | 7/2004 | Ko et al. ......................... 74/492 |
| 2004/0134302 A1 | 7/2004 | Ko et al. |
| 2008/0042420 A1 * | 2/2008 | Ali et al. ....................... 280/775 |

(Continued)

FOREIGN PATENT DOCUMENTS

| DE | 196 43 203 | 4/1998 |
| DE | 10 2007 003 091 | 8/2008 |

(Continued)

OTHER PUBLICATIONS

International Search Report (ISR) issued Nov. 9, 2012 in International (PCT) Application No. PCT/EP2012/000071.

*Primary Examiner* — Ruth Ilan
(74) *Attorney, Agent, or Firm* — Wenderoth, Lind & Ponack, L.L.P.

(57) ABSTRACT

A fixing device has at least one clamping device and at least one locking element which can be acted upon by the clamping device, and at least one counter locking element. In a closed position of the clamping device, the locking element and the counter locking element are arranged in an engagement position, and the fixing device has at least one elastic resetting element for resetting the locking element in an open position of the clamping device. The fixing device has at least one engagement element which, in the closed position of the clamping device, is in engagement by preferably plastic deformation of at least one surface of the locking element and/or of the counter locking element in a form-fitting manner with the surface.

20 Claims, 4 Drawing Sheets

(56) References Cited

U.S. PATENT DOCUMENTS

2009/0151498 A1* 6/2009 Garbrecht et al. .............. 74/493
2010/0275721 A1* 11/2010 Davies et al. ................... 74/493
2012/0304795 A1* 12/2012 Tinnin et al. .................... 74/493

FOREIGN PATENT DOCUMENTS

| EP | 0 802 104 | 10/1997 |
| EP | 1 435 317 | 7/2004 |
| WO | 2006/118054 | 11/2006 |

* cited by examiner

FIXING DEVICE FOR FIXING A STEERING SPINDLE BEARING UNIT

BACKGROUND OF THE INVENTION

The present invention relates to a securement device for securing a steering spindle bearing unit on a bracket unit of an adjustable steering column for a motor vehicle. The securement device comprises at least one clamping device and at least one locking element, activatable by the clamping device, as well as at least one counterlocking element. The locking element and the counterlocking element, in a closed position of the clamping device, are disposed in an engagement position, and the securement device comprises at least one resilient reset element for resetting the locking element in an open position of the clamping device.

In adjustable steering columns for motor vehicles, securement devices are employed in order to secure or lock the adjustable steering column in the set position for normal operation of the motor vehicle. When the securement device or its clamping device are in an open state, the steering wheel attached on the adjustable steering column can be adjusted by the driver of the motor vehicle into the desired position in the height and/or length direction. In the prior art, such securement devices are also referred to as clamping systems. There are securement devices that are based on the engagement of locking and counterlocking element under form closure. However, there are also securement devices in which by means of a clamping locking element and counterlocking element in the closed position of the clamping device are exclusively in operational connection under friction closure. Friction closure is disclosed in prior art for example in EP 0 802 104 A1.

The problem encountered in the case of clamping under friction closure is attaining sufficient fixedness and resistance of the connection against a dislocation of the steering column during the operation of the motor vehicle. In many cases, in particular high fixedness of the connection is to be ensured even in the event of a crash. However, simultaneously the capability of simple adjustments is also to be given in the open position of the clamping device. In general, it is herein preferred for the adjustability of the steering column in the height and/or length direction to be an infinite one.

EP 0 802 104 A1 proposes the use of several frictional faces in order to increase the frictional force correspondingly. DE 196 43 203 A1 shows an example of the connection under form closure by means of teeth engagement known in the prior art. However, this technology also entails various problems. On the one hand, not every adjustment position can be set and, on the other hand, there is always the risk that when closing the securement device the tips of the toothings corresponding to one another impact one another and, accordingly, no secure engagement takes place. A further disadvantage of such form-closure solutions involving toothing engagement is that in the open position of the clamping device a free-moving friction closure clamping of the steering column must be achieved using special means such that the column does not rattle and is smoothly adjustable.

A generic securement device is shown in DE 10 2007 003 091 B3. In this implementation according to the prior art, the form-closure engagement of locking element and counterlocking element is again achieved by means of toothing when the clamping device is in the closed position. In the open position of the clamping device, the locking element is lifted out of the toothing of the counterlocking element by spring arm-like resilient reset elements. This is intended to ensure that relatively high holding forces can be provided. On the other hand, for the case of very high forces occurring, for example in the event of a motor vehicle crash, a form-closure connection between locking and counterlocking element is to be effected via the edge-side toothing. The implementation shown in DE 10 2007 003 091 B3 entails the above listed disadvantages of engagement by toothing. Especially with frequent adjustments of the steering column, the toothings can become only half engaged. A disadvantage of this solution according to the prior art between locking and counterlocking element accordingly consists in damage to the edge-side teeth with frequent and strong strain. With these implementations, further, the form-closure snap-in-locking between locking and counterlocking element potentially occurs only after a certain displacement path. This occurs if during the closure of the clamping device, the teeth do not mesh with one another but come to lie one on the other. If this displacement path is to be kept short, the tooth must also be kept small which increases the loading of the tooth material.

SUMMARY OF THE INVENTION

The invention addresses the problem of improving a generic securement device to the extent that, on the one hand, it enables infinite adjustability and, on the other hand, provides high resistance against dislocation of the steering column in the closed state of the clamping device.

To attain this, the invention proposes a securement device.

Consequently, the invention provides that the securement device comprises at least one engagement element which, in the closed position of the clamping device, by means of preferably plastic reforming of at least one surface of the locking element and/or of the counterlocking element, is in engagement with this surface under form closure.

It is consequently a fundamental concept of the invention to equip the securement device with at least one engagement element which, during the closing of the clamping device, carves itself into at least one surface of the locking element and/or of the counterlocking element and thus ensures, by means of preferably plastic reforming, an engagement under form closure. This leads to the desired high resistance forces against a dislocation of the steering column or the steering spindle in the closed position of the clamping device. Yet, this realization of the form closure by reforming of the surface also has the advantage that form-closure engagement of the engagement element is possible at any of the desired sites since with each closing of the clamping device a new, preferably plastic, reforming takes place with which the engagement element carves into the surface at any of the set or desired sites. It is herein also insignificant if in the immediate vicinity of this site there is still a hole or a recess from a preceding engagement of the engagement element into the surface. Through the reforming during the closing of the clamping device, the engagement element generates a new recess in the surface, whereby an older recess, disposed originally perhaps directly adjacently, can also be closed again through the reforming process. It becomes hereby feasible to adjust the adjustable steering column often and infinitely, wherein after the adjustment the desired high resistance force against a dislocation of the steering column in the closed position of the clamping device is attained again. The surface into which the engagement element engages is consequently specifically provided or laid out for the purpose of becoming reformed multiple times by the engagement element. Before the first engagement of the engagement element into the surface, this surface can be implemented planar or smooth.

The term "at least one engagement element" means that it is feasible to provide, in fact, only one single engagement element. However, as a rule, the securement device will comprise several relevant engagement elements which subsequently advantageously carve simultaneously into the surface during the closing of the clamping device. The universal use throughout of the formulation 'at least one engagement element' in the patent claims and the description is a purely linguistic simplification. The same applies also to the other structural components which are listed as 'at least one structural component'.

The engagement element can be disposed at several different structural components of the securement device. It is, for example, feasible for the engagement element to be disposed on an additional support between the locking element and the counterlocking element, and the surface, with which the engagement element is in engagement in the closed position of the clamping device, is a portion of the locking element or of the counterlocking element. However, it is also feasible for engagement elements to project on both sides of this support, which, in this case, engage into a surface of the locking element as well as also into such a surface of the counterlocking element when the clamping device is brought into the closed position. However, it is also feasible for the engagement element to be a portion of the locking element or a portion of the counterlocking element and the surface, into which the engagement element engages, is associated with the, in each case, other structural component. Preferred embodiments of the invention in this context provide for the engagement element to be preferably integrally implemented on the locking element. Stated differently, the engagement element can consequently be a permanent or fixed structural component of the locking element. It is understood that the same applies conversely also to the counterlocking element. It is preferably provided for the locking element to comprise a plate-like base body. This can also be realized at the counterlocking element.

The engagement element projects advantageously beyond or from the plate-like base body. Especially preferred embodiments provide for the clamping device in its closed position to prestress the locking element in a clamping direction against the counterlocking element and for the engagement element to project in the direction parallel to the clamping direction from a surface, facing the counterlocking element, of the locking element.

In terms of the above described reforming of the surface during the engagement of the engagement element, it is advantageous for the engagement element to be harder than the surface with which it is in engagement in the closed position of the clamping device. This can be attained, for example, through the selection of different materials or through appropriate tempering of the engagement element.

In the opened position of the clamping device, it is advantageously provided for the resilient reset element to effect an abrogation of the form-closure engagement of the engagement element into the surface with which it is in engagement in the closed position of the clamping device. For this purpose, the appropriate lifting of the engagement element from the surface can be achieved by the resilient reset element. Herein, the complete lifting or bringing out of contact is preferred. At least one contact element is advantageously provided, which can also be realized as a spacer, which, after lifting the at least one engagement element from the surface of the locking part or the counterlocking element, is in contact with a surface of the locking element or counterlocking element. Hereby, even in the open position of the clamping device, an additional friction closure between the contact element, which can also be a spacer, and the surface can be provided which through the friction force counteracts an undesirable displacement of the adjustable steering column in the open position of the clamping device and thereby facilitates the selective adjustment by the driver of the motor vehicle. Through this measure the rattling in the open position of the clamping device can also be prevented. It is of advantage for the contact element to be connected with the locking element or with the counterlocking element.

The resilient reset element can fundamentally be a separate structural component acting between the locking element and the counterlocking element, such as, for example, one or several springs or the like. Especially for this case, it is conceivable and feasible for the contact element to be connected with the resilient reset element and/or be formed by it. However, preferred embodiments provide that the resilient reset element is realized in the form of an elastic deformability of the locking element. Stated differently, the locking element or a region thereof herein forms itself the resilient reset element. In particular in the case of locking elements with a plate-like base body these resilient properties for providing the resilient reset element can be attained through the appropriate material selection and setting of the thicknesses. It is understood that the counterlocking element can also be correspondingly realized for the realization of the resilient reset element.

Independently of the type of realization of the resilient reset element or of the resilient reset elements, the invention advantageously provides that the resilient reset element during the movement of the clamping device into its open position automatically abrogates the form-closure engagement of the engagement element into the surface with which it is in engagement in the closed position of the clamping device. Therewith is ensured that no scoring of the material or the like can occur during an adjustment activation. Abrogating the engagement form closure in the open position of the clamping device or a corresponding separation of the structural components, however, can alternatively also take place via an additional element or through the installation of another element that ensures the requisite separation.

The layout of the engagement element or of the engagement elements and of the locking element and of the counterlocking element is advantageously performed such that the clamping device during its movement between the closed and open position (and conversely) only needs to generate the smallest possible excursion. In these terms, it is advantageous if the engagement element is realized such that it is relatively flat-angled. A few tenths millimeter can here already suffice. The extent of the engagement element in the clamping direction is advantageously between 0.1 and 0.4 mm, preferably only 0.2 mm. Stated differently, the engagement elements consequently projects maximally between 0.1 and 0.4 mm, preferably only 0.2 mm. The engagement element can in principle have the most diverse geometric forms. The element can be a straight or angled cleat or the like. However, especially preferred embodiments provide for the engagement element to be realized as a nub. In the case of several engagement elements, a corresponding nub field results. It is preferred to select as irregular an arrangement as possible in order to prevent that at different settings different nubs can carve themselves in at one and the same point of the surface of the counterlocking element or of the locking element in the case of locking.

The engagement element, and in particular corresponding nubs, can be formed for example using a stamping process. The type of stamping and the number of nubs or engagement elements can be laid out such that the tips of the nubs or engagement elements under the clamping force of the clamping device carve or form themselves by at least half the height, preferably by the entire height, into the surface when the clamping device is brought into the closed position. The engagement elements or nubs are advantageously distributed. They are preferably spaced apart from one another.

Preferred embodiments of the invention provide for at least one spacer to be disposed between the locking element and the counterlocking element and to be spaced apart from the engagement element. This spacer also contributes to the engagement element being automatically lifted from said surface by the resilient reset element in the open position of the clamping device. The spacer can be disposed or fixed on the locking element but also on the counterlocking element or on both of the elements or also be retained by other means between the locking element and counterlocking element.

Preferred embodiments of the invention provide in this context that the clamping device comprises one clamp bolt preferably penetrating through the locking element and/or the counterlocking element, with the spacer being further removed from the clamp bolt than the engagement element. This does not absolutely need to be the case, however, it is advantageous in terms of spatial forces distribution. Especially preferred is the use of several engagement elements implemented as nubs which are distributed in the proximal vicinity of the clamp bolt. The proximal vicinity in terms of the invention is that region within a radius about the clamping axis that has a magnitude of approximately one third to maximally one half of the distance from one of the contact elements or spacers to the clamping axis. When in doubt, the clamping axis is formed by the center longitudinal axis of the clamp bolt.

In order to enable as high a force as possible to be applied in the region of the engagement element(s) by means of the clamping device, preferred embodiments of the invention provide that the clamping device in its closed position tightens the locking device in a clamping direction against the counterlocking element and that it includes a press pad, wherein the press pad acts, preferably only in the proximity of the engagement element, upon the locking element in the closed position in the clamping direction. Stated differently, the press pad or the pressure piece acts as directly as possible on the rear side of the locking element or potentially the counterlocking element or the other supports where, on the opposite front side, the engagement element or elements are located. The press pad or the pressure piece can act, for example, directly onto the locking element and/or counterlocking element on that side that is opposite the engagement element.

Apart from the securement device per se, the invention also relates to an adjustable steering column for a motor vehicle, wherein the adjustable steering column comprises a steering spindle bearing unit for the rotatable bearing of a steering spindle and a bracket unit provided for securing the adjustable steering column on the body of the motor vehicle. The adjustable steering column comprises a securement device according to the invention for securing the steering spindle bearing unit on the bracket unit. In especially preferred embodiments of such adjustable steering columns, the counterlocking element is a component, preferably a side jaw adjacent to the steering spindle bearing unit, of the bracket unit.

The steering spindle bearing unit is consequently that structural component of the adjustable steering column in which the steering spindle is rotatably bearing supported. The bracket unit is that part of the adjustable steering column which serves for securing the adjustable steering column on the body of the motor vehicle. To adjust the position of the steering spindle, and therewith the steering wheel to be secured thereon, the steering spindle bearing unit is displaced relative to the bracket unit that is body-stationary or that is securable on the body. Adjustable steering columns according to the invention can herein provide the adjustment in the longitudinal direction of the steering spindle or in a height direction orthogonal thereto or in both of the directions.

BRIEF DESCRIPTION OF THE DRAWINGS

Further features and details of preferred embodiments of the invention are evident based on the following description of the Figures, in which.

DETAILED DESCRIPTION OF THE INVENTION

Similar elements or elements having the same effect are denoted in the Figures by the same reference numbers.

Figure 1:
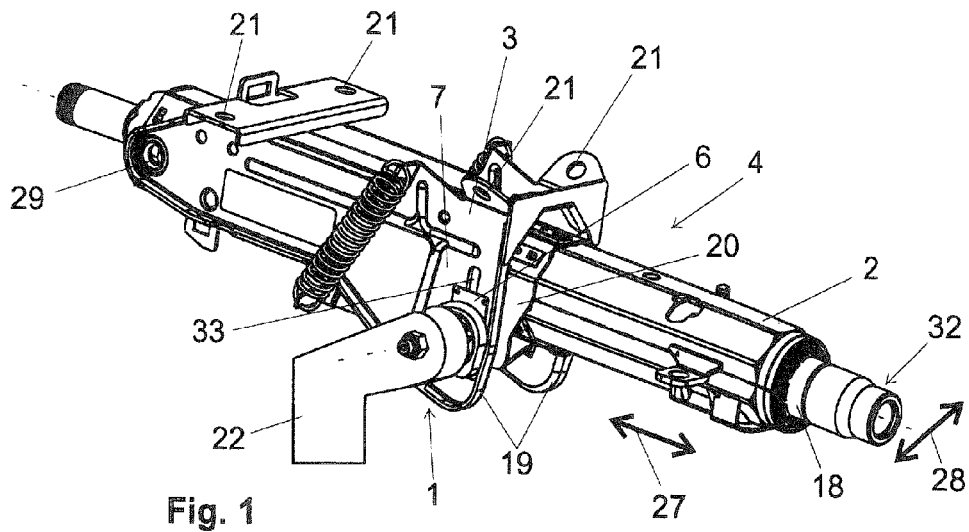
FIGS. 1 and 2 show of an adjustable steering column implemented according to the invention.
Figure 2:
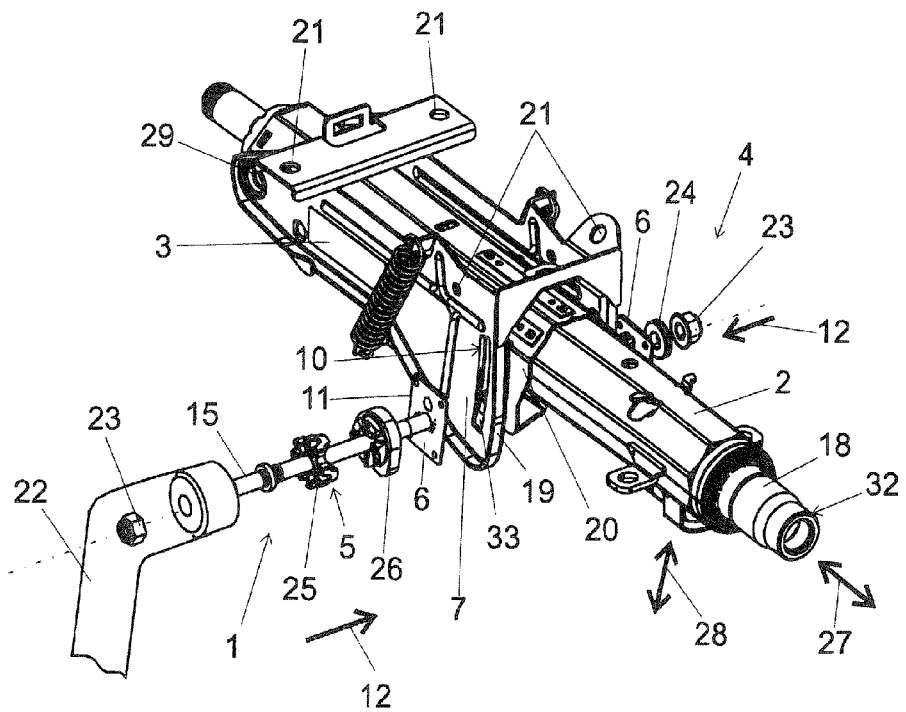

FIGS. 1 and 2 show in perspective depiction an adjustable steering column 4 with a securement device 1 implemented in the form of a first embodiment of the invention. First, the features known per se of this adjustable steering column 4 will be discussed. It comprises a steering spindle bearing unit 2 in which the steering spindle 18 is bearing supported such that it is rotatable about its longitudinal axis. On the steering wheel adapter 32 of the steering spindle 18 can be connected the steering wheel, not shown here. To implement the depicted steering column as an adjustable steering column 4, the steering spindle bearing unit 2 is supported on the bracket unit 3 such that it is displaceable. The bracket unit 3 is that structural component of the adjustable steering column 4 that is or becomes fixed on the body of the motor vehicle. In the depicted embodiment, securement plates 21 are provided for this purpose. It is understood that the bracket unit 3 can also be secured fixedly or detachably in a different manner on the body of the motor vehicle. In the depicted embodiment, between bracket unit 3 and steering spindle bearing unit 2 is located an intermediate part 20 known per se which is secured via a swivel joint 29 on the bracket unit 3 such that it is swivellable. With the securement device 1 open, the steering spindle bearing unit 2 in the depicted embodiment, can be displaced relative to the bracket unit 3 in the length directions 27 as well as also in the height directions 28. In the depicted embodiment, the length adjustment takes place through the corresponding shifting of the steering spindle bearing unit in one of the length directions 27 in the intermediate part 20 and the height adjustment in one of the height directions 28 takes place by swiveling steering spindle bearing unit 2 together with the intermediate part 20 about the swivel joint 29 relative to the bracket unit 3. In the closed state of the securement device 1 the holding forces are of such magnitude that at least during normal operation a displacement in the length direction 27 or in the height direction 28 is not possible. In the closed position, the securement device 1 presses the two side jaws 19 of the bracket unit 3 so firmly against the intermediate part 20 and the steering spindle bearing unit 2 that the desired locking is achieved. For the event of a crash, even with the securement device 1 closed, a dislocation, especially in the length direction 27 and preferably with the intermediate placement of special energy absorption elements, can be possible. This can be realized as is known in prior art per se and does not need further explanation here. The side jaws 19 are in any case implemented elastically resilient such that, with the securement device 1 open, they enable the adjustment feasibilities of the adjustable steering column 4.

The securement device 1 of the depicted embodiment is implemented in multiple parts. It comprises the clamping device 5, here also implemented in multiple parts, as well as in the depicted embodiment also the two side jaws 19 of the bracket unit 3. The clamping device 5 realized here also comprises several structural components. These are a manual operating lever 22, a clamp bolt 15, a first and second cam arrangement 25 and 26 as well as nuts 23 and a compression bearing 24. In addition, the clamping device 5 comprises according to the invention also pairwise cooperating locking elements 6 and counterlocking elements 7, which, in the depicted embodiment, are implemented or disposed on both sides, thus in the proximity of both side jaws 19. The cooperation according to the invention of the locking elements 6 and counterlocking elements 7 will be described further down. First is emphasized that the clamping device 5 can be brought from its open position into its closed position and conversely by swivelling the manual operating lever 22 about the longitudinal axis of the clamp bolt 15. As is known per se, for this purpose one of the two cam arrangements 25 or 26 can be connected torsion-tight with the manual operating lever 22 and the other of the two cam arrangements 25 or 26 can be connected torsion-tight with the bracket unit 3. By turning the two cam arrangements 25 and 26 with respect to one another about the longitudinal axis of the clamp bolt 15, an excursion is generated which in the closing direction leads to an interlocking of the side jaws 19. The clamping directions 12, thus the directions in which, during the closing of the clamping device 5, pressure is built up, are drawn in FIG. 2 and extend parallel to the longitudinal axis of the clamp bolt 15.

In the depicted embodiment, the clamp bolt 15 penetrates through elongated holes 33 in side jaws 19 whereby the height adjustment in the height directions 28 is enabled.

Before discussing the cooperation according to the invention of locking element 6 and counterlocking element 7, reference is made to the fact that the securement device 1 is in its open position when the clamping device 5 is in its open position. The same applies to the closed position, here also the securement device 1 is in its closed position when the clamping device 5 is also in its closed position. Reference is further made to the fact that the depicted embodiment is only one of many possible variants of an adjustable steering column 4. All implementation features known in prior art can be replaced by other implementation features known in prior art, provided a functional adjustable steering column results herefrom. For example, the intermediate part 20 can be omitted or it can be suitably replaced. The adjustable steering column 4 can be one that is only adjustable in the length directions 27 or only in the height directions 28. Steering spindle bearing unit 2 and bracket unit 3 can be realized differently. The same applies to the features known per se of securement device 1 and clamping device 5. For example the manual operating lever 22 can be replaced by an electric motor or the like. The same applies to the realization and torsion-tight fixing of the cam arrangements 25 and 26, to name only a few examples of divergent implementation variants.

As explained in the introduction, the invention addresses the problem of implementing the securement device 1 or the clamping device 5 such that an unintentional displacement of steering spindle bearing unit 2 relative to the bracket unit 3 in the closed position of the clamping device 5 is effectively prevented. However, on the other hand, every position within the system-dependent displacement limits can also be set, thus an infinite adjustment is enabled.

The measure according to the invention already described in the introduction is provided for this purpose. In the depicted embodiment, several engagement elements 9 are provided which in this variant of the invention are a component of the locking element 6. The locking element 6 comprises a plate-like base body 11 from which the engagement elements 9 project in the direction toward the counterlocking element 7 and parallel to the clamping direction 12. In the depicted embodiment, the engagement elements 9 are realized in the form of embossed nubs. The counterlocking element 7 in the depicted embodiment is in each case a component of the side jaw 19. The surface 10 of the counterlocking element 7 into which the engagement elements 9 engage or carve are the surface regions next to the elongated holes 33. It should be understood that this is only an example. Converse dispositions are also conceivable. The engagement elements 9 could also be disposed on the counterlocking element 7, thus here on the side jaws 19. In this case the surface 10 would, for example, be located on the locking element 6. In contrast hereto, it is even conceivable for the engagement elements 9 to be disposed on a separate support between locking element 6 and counterlocking element 7, and locking element 6 as well as counterlocking element 7 to comprise corresponding surfaces 10 into which the engagement elements 9 carve during the closing of the clamping device 5. It is an essential fundamental concept of the invention for the engagement elements 9 to carve into the surface 10 by reforming it. While the engagement elements 9 are impressed into the corresponding sites of the surface 10, an indentation is created thereby that material of the surface 10 generated from this region is pressed into side regions. This type of reforming can take place at any site of the surface 10. If this reforming strikes a reforming that has occurred previously at this location, the old reforming is punched over. This has two advantages. For one, through the carving of the engagement elements 9 into the surface 10 and the reforming carried out thereby a form closure, and therewith a highly stable securement or locking, is attained. Yet, for another, in terms of an infinite adjustment any desired position can be set. Even if at this site a surface structuring from an older reforming of the surface 10 is still located, this older forming is punched over by the renewed carving of the engagement elements 9 and the reforming entailed therein, such that the form closure is realized at the new desired site. In the open position of the clamping device 5, in contrast, the form closure is to be abolished again. To this end it is advantageous if a resilient reset element 8 is provided which, in the open position of the clamping device 5, lifts the engagement element 9 or the engagement elements 9 from the surface 10. The resilient reset element or elements 8 can be separate structural components such as springs or the like. However, preferred embodiments, such as those shown here, provide for the resilient reset element 8 to be realized in the form of an elastic deformability of the locking element 6. Especially in the case of the last-mentioned variants, spacers 14, spaced apart from the engagement elements 9, can be provided. In the variants, depicted in FIGS.

1 to 8, of the invention these spacers 14 are components of the locking element 6, however here they are disposed at the margin.

Figure 3:
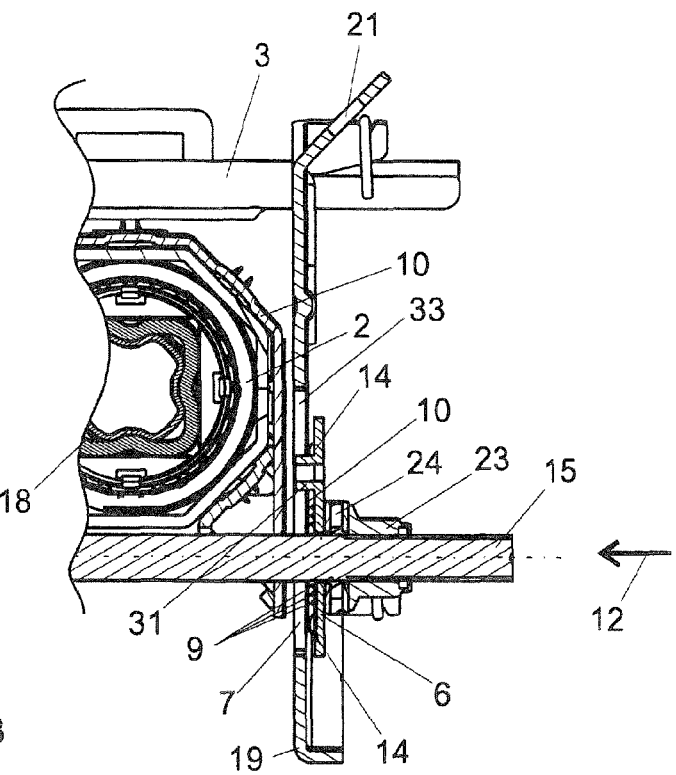
FIGS. 3 and 4 show a first embodiment variant according to the invention in a detail depiction in a section plane normal to the longitudinal direction of the steering spindle.

FIG. 3 shows the open position of the clamping device 5 in a section normal to the longitudinal axis of the steering spindle 18. In this position, the engagement elements 9 fixed on the locking element 6 are not carved into the surface 10 of the region of the side jaw 19 utilized here as the counterlocking element 7. In the open position of the clamping device 5, the engagement elements 9 are herein completely lifted from the surface 10 such that there is no longer any friction closure.

Figure 4:
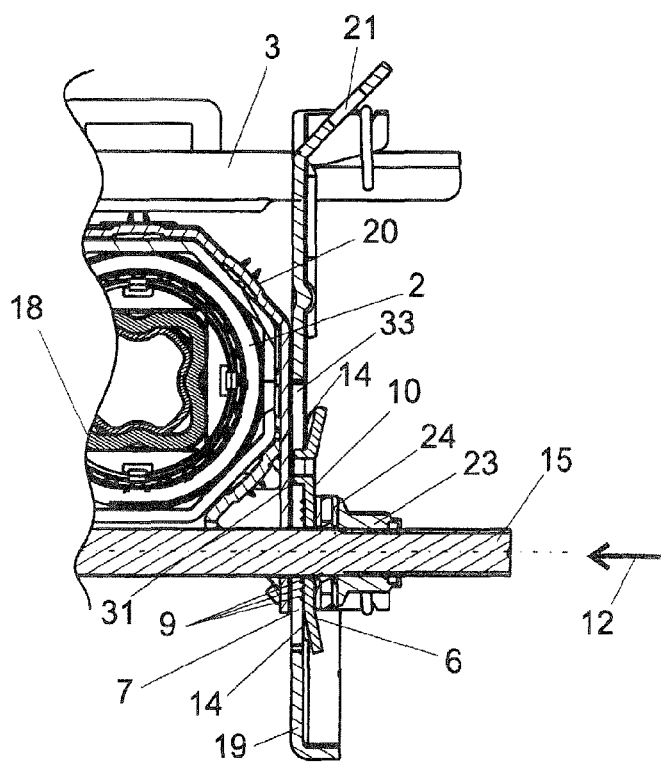
Figure 6:
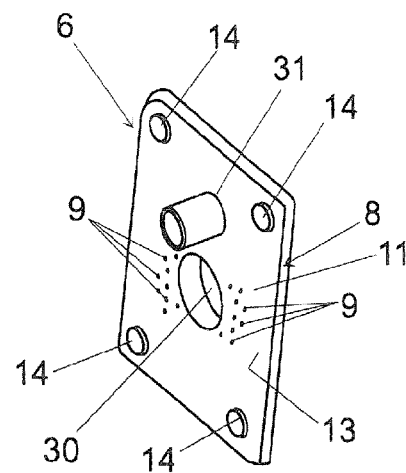
FIG. 6 shows the locking element associated with the embodiment according to FIG. 5.
Figure 9:
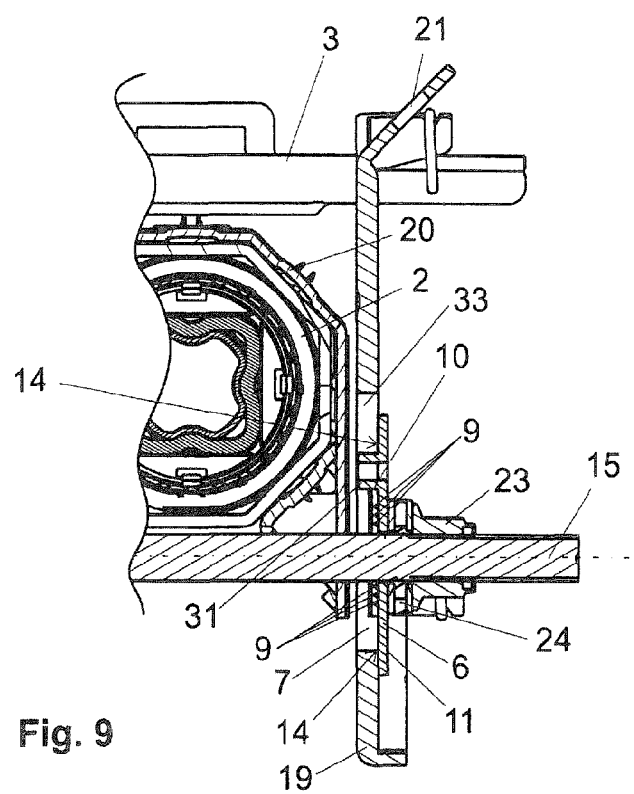
FIGS. 9 and 10 show a second embodiment according to the invention in a type of depiction analogous to FIGS. 3 and 4.
Figure 10:
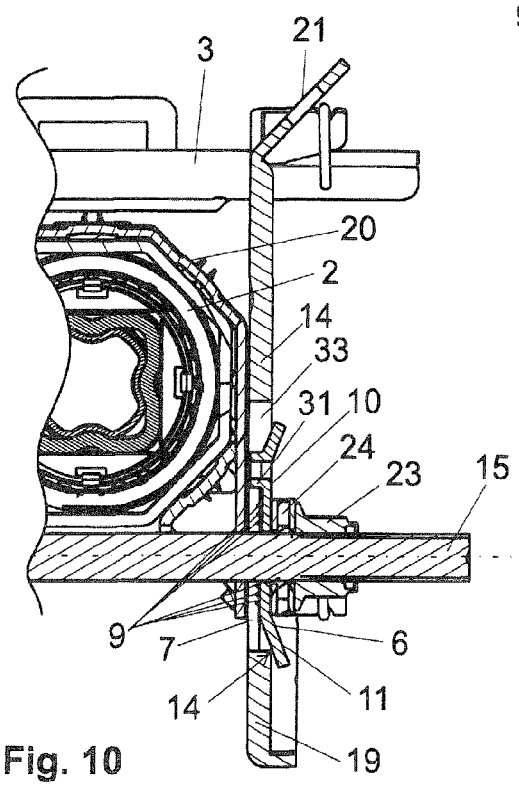

FIG. 4 shows the clamping device 5 in its closed position. The engagement elements 9 in this position have carved themselves into the surface 10 reforming the latter such that the desired form closure has been attained. For the sake of completeness, reference is made to the fact that the engagement elements 9 are, in fact, not located in the sectional plane shown in FIGS. 3 and 4 but rather in front and/or behind it. In the section plane they would engage into the elongated hole 33 and therewith into void. For the sake of depicting them, they are drawn in FIG. 4 even if in this position they are carved into the surface 10 and are thereby bent. The same applies also to the FIGS. 9 and 10 shown later. During the opening of the clamping device 5 in the depicted embodiment, the plate-like base body 11 resiliently resets the locking element 6 back into its position according to FIG. 3. FIG. 6 shows the locking element 6 utilized in this embodiment. The plate-like base body 11 includes a receiving cutout 30 and a torsional protection 31. The clamp bolt 15 is guided through the receiving cutout 30. The engagement elements 9, implemented here in the form of nubs, project parallel to the clamping direction 12 from the plate-like base body 11 and are disposed in the immediate vicinity of the receiving cutout 30 and therewith of the clamp bolt 15. The spacers, in this embodiment also disposed on the plate-like base body 11, are in comparison further removed from the receiving cutout 30 and therewith from the clamp bolt 15. It is in general advantageous if in embodiments such as those shown the engagement elements 9 are disposed as close as possible to the clamp bolt 15 since here constructionally simply the highest forces can be transmitted. However, in view of the overall system, the disposition of the engagements 9 should be such that they engage into the surface 10 with laterally sufficient spacing next to the elongated hole 33 since otherwise there is a risk of damage to the guide way. It is understood that, instead of the depicted nubs, geometrically differently formed-out projections can be provided as engagement elements 9. These can be, for example, cleats, sawteeth or the like. The surface 13, from which project the engagement elements 9, should in the assembled state advantageously be disposed opposite the surface 10 into which the engagement elements 9 penetrate. The one or the several torsional protection(s) 31 engage into the elongated hole 33 such that during the displacement of the steering spindle bearing unit in the adjustment direction, given by the elongated hole 33, guidance under torsional protection of the locking element 6 is given. A minimal torsional play can herein be intentionally provided. In the depicted embodiments the torsional protections 31 are simultaneously, through a collar-draw operation, implemented as a receiving cutout for receiving a guide pin 16 of the second cam arrangement 26 facing the locking element 6. In this simple manner a torsional protection is formed for the locking element as well as also for the second cam arrangement 26. However, it is conceivable and feasible to implement the technical solution without torsional protections 31 also. The elongated hole 33 can be realized linearly or in the form of an arc. Independently of whether the elongated hole 33 is linear or in the form of an arc, an identical or identically realized locking element 6 can be employed.

It is, however, preferred to provide a torsional protection. Alternatively to the depicted solutions, guide pin 16 could also be disposed on the locking element 6, and a corresponding torsional protection 31 could be disposed on the corresponding counter piece. Moreover, there are still many other options conceivable for torsional protection. Other connection or torsional protection means are also conceivable and feasible, such as a recurved metal sheet tab which engages into a recess of the cam arrangement 26 or encompasses it. The guide pin 16 effecting the torsional protection can also be of such length that it projects in terms of torsional protection into the elongated hole 33. If for the compression bearing 24 a torsional protection is to be also prepared, this can be implemented analogously to that for the cam arrangement 26. The compression bearing 24 can also be realized simply as a washer. FIGS. 3 and 4 as well as 9 and 10 illustrate that the compression bearings 24 do not absolutely need to be equipped with guide pins 16.

Figure 5:
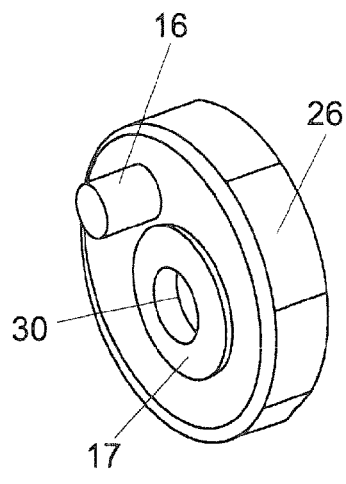
FIG. 5 shows a part of the clamping device with a press pad disposed thereon, in a first embodiment.
Figure 7:
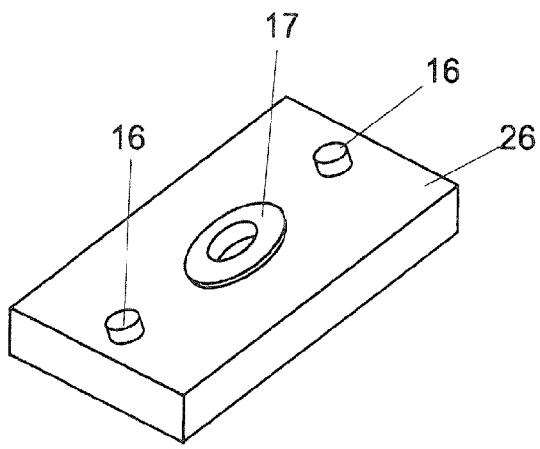
FIG. 7 shows an alternative embodiment of a corresponding part of the clamping device.
Figure 8:
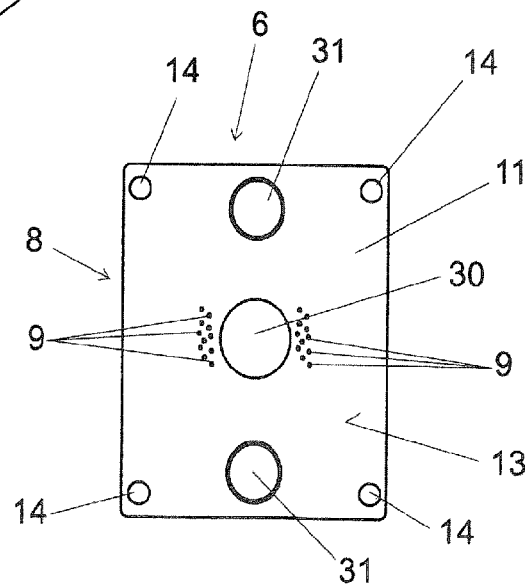
FIG. 8 show an embodiment of the locking element which is combinable with the clamping element according to FIG. 7.

FIG. 5 shows the backside of the second cam arrangement 26 on which the guide pin 16 of the torsional protection is fixed. The guidance geometry is disposed opposite the receiving cutout 30 for the clamp bolt 15 such that the locking element 6 can move in straight-line as well as curved guide ways without a redevelopment being required for this purpose. This enables similar locking elements 6 and cam arrangements 25 and 26 to be employed in different adjustable steering columns 4. The receiving cutout 30 for the clamp bolt 15 is surrounded in the second cam arrangement 26 by a convex region which forms the press pad 17 or the pressure piece. This press pad presses onto the backside of the locking element 6 in that region in which on the other side the engagement elements 9 are disposed such that these, as already described, carve into the surface 10 of the counterlocking element 7 during the closing of the clamping device 5. The locking element 6 or its plate-like base body 11 are herein, as described, elastically deformed. On the opposite side or in the proximity of the opposite side jaw 19, a press pad 7 is correspondingly disposed on the compression bearing 24. FIGS. 7 and 8 show divergent implementations of locking element 6 and second cam arrangement 26 or compression bearing 24. Yet the difference between them consists only therein that in the embodiment according to FIGS. 7 and 8 two guide pins 16 are disposed instead of one guide pin 16.

As already explained in the introduction, it is advantageously provided that the engagement elements 9 and/or also the entire locking element 6 is or are realized of a harder material than the surface 10 into which carve the engagement elements 9.

Figure 11:
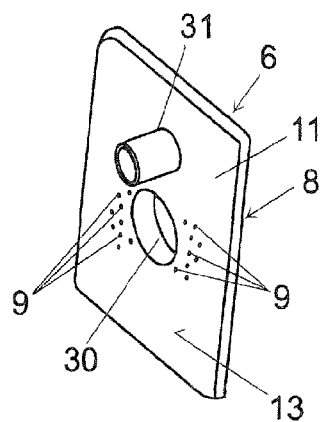
FIG. 11 shows a locking element associated with FIGS. 9 and 10.

An alternative embodiment of the invention is shown in FIGS. 9 to 11. In contrast to the first embodiment, the spacers 14 are here not implemented on the locking element 6, but rather as a component of the counterlocking element 7. The spacers 14 in this embodiment according to FIGS. 9 to 11 are formed by a margin region of the counterlocking element 7 which encompasses that region (=the surface 10) into which the engagement elements 9 engage when the securement device is closed. Between these spacers 14 or the margin regions is located a recessed region in which is located the surface 10. FIG. 9 shows in a depiction analogous to FIG. 3 the clamping device 5 in the open position. In this open position, the engagement elements 9 of the locking element 6 are not carved into the surface 10 of the counterlocking element 7. FIG. 10 shows the closed position of the clamping device 5. In the closed position, the locking element 6 has been deformed to such an extent that the engagement elements 9 have carved into the surface 10 and consequently the desired form closure has been attained. Due to the elastic properties and the conditional resilience due thereto of the plate-like base body 11, during the opening of the clamping device 5 the state according to FIG. 9 is reached again. For the reasons mentioned, in this embodiment is also advantageously provided that the spacers 14 in the open position of the clamping device 5 are still in contact on the locking element 6 under friction closure. It is understood that here also the complete lifting in the open state of the clamping device 5 can be realized. FIG. 11 shows a feasible variant of the locking element 6 according to this embodiment. It differs from FIG. 6 only by the omission of the spacers 14.

In conclusion, reference is made to the fact that the invention can also be realized with clamping devices differing from those shown. Instead of the cam arrangements 25 and 26, for example, an axial pressure plate, movable in the direction parallel to the clamp bolt 15, can be provided. For example, between the cam contours rolling bodies can also be disposed. Other solutions are also conceivable and feasible.

According to the embodiments, through the fixing under form closure of the steering spindle bearing unit 2 with respect to the bracket unit 3, a high fixing force is provided in the height direction 28. In particular in the event of a crash in this way obliquely acting forces acting onto the steering spindle bearing unit in the event of a crash are braced and the torsioning of the steering column can be prevented. If an especially high resistance force against a displacement of the steering spindle bearing unit 2 with respect to the bracket unit 3 in the length direction is required, the invention can in this case also be employed.

To the extent it is technically feasible, different features of the above described embodiments can also be combined with one another and replaced without leaving the scope of the invention.

LEGEND TO THE REFERENCE NUMBERS

1 Securement device
2 Steering spindle bearing unit
3 Bracket unit
4 Adjustable steering column
5 Clamping device
6 Locking element
7 Counterlocking element
8 Resilient reset element
9 Engagement element
10 Surface
11 Plate-like base body
12 Clamping direction
13 Surface
14 Spacer
15 Clamp bolt
16 Guide pin
17 Press pad
18 Steering spindle
19 Side jaw
20 Intermediate part
21 Securement plate
22 Manual operating lever
23 Nut
24 Compression bearing
25 First cam arrangement
26 Second cam arrangement
27 Length direction
28 Height direction
29 Swivel joint
30 Receiving cutout
31 Torsional protection
32 Steering wheel adapter
33 Elongated hole

The invention claimed is:

1. A securement device for securing a steering spindle bearing unit on a bracket unit of an adjustable steering column for a motor vehicle, the securement device comprising:
   a clamping device;
   a locking element actuable by the clamping device; and
   a counterlocking element;
   wherein the locking element and the counterlocking element in a closed position of the clamping device are disposed in an engagement position, and the securement device is configured to resiliently reset the locking element in an open position of the clamping device, and
   wherein the securement device comprises an engagement element which, in the closed position of the clamping device, is in engagement with at least one surface of the at least one of the locking element and the counterlocking element under form closure by reforming of the at least one surface of the at least one of the locking element and the counterlocking element.

2. The securement device as in claim 1, wherein the engagement element is harder than the surface with which it is in engagement in the closed position of the clamping device.

3. The securement device as in claim 1, wherein the engagement element is implemented on the locking element.

4. The securement device as in claim 1, wherein the clamping device in its closed position tightens the locking element in a clamping direction against the counterlocking element, and the engagement element projects in a direction parallel to the clamping direction from a surface of the locking element, the surface facing the counterlocking element.

5. The securement device as in claim 1, wherein the locking element is elastically deformable to resiliently reset the locking element in the open position.

6. The securement device as in claim 1, wherein a spacer is disposed between the locking element and the counterlocking element and is spaced apart from the engagement element.

7. The securement device as in claim 6, wherein the clamping device comprises a clamp bolt, wherein the spacer is further removed from the clamp bolt than the engagement element.

8. The securement device as in claim 7, wherein the clamp bolt penetrates through the locking element.

9. The securement device as in claim 8, wherein the clamp bolt further penetrates through the counterlocking element.

10. The securement device as in claim 7, wherein the clamp bolt penetrates through the counterlocking element.

11. The securement device as in claim 1, wherein the clamping device in its closed position tightens the locking element in a clamping direction against the counterlocking element and comprises a press pad, wherein the press pad activates the locking element in the closed position in the clamping direction in the proximity of the engagement element.

12. The securement device as in claim 11, wherein the press pad activates the locking element in the closed position in the clamping direction only in the proximity of the engagement element.

13. An adjustable steering column for a motor vehicle, wherein the adjustable steering column comprises a steering spindle bearing unit for the rotatable bearing of a steering spindle, and a bracket unit for the securement of the adjustable steering column on the body of a motor vehicle, wherein the adjustable steering column comprises a securement device as in claim 1 for securing the steering spindle bearing unit on the bracket unit.

14. The adjustable steering column as in claim 13, wherein the counterlocking element is a component of the bracket unit.

15. The securement device as in claim 14, wherein the counterlocking element is a side jaw of the bracket unit disposed adjacent to the steering spindle bearing unit.

16. The securement device as in claim 1, wherein the engagement element is, in the closed position of the clamping device, in engagement with the at least one surface of at least one of the locking element and the counterlocking element under form closure by plastic reforming of the at least one surface.

17. The securement device as in claim 1, wherein the locking element comprises a plate-shaped base body.

18. The securement device as in claim 1, wherein the engagement element comprises nubs.

19. The securement device as in claim 1, wherein the engagement element is implemented integrally on the locking element.

20. The securement device as in claim 1, further comprising a resilient reset element for resiliently resetting the locking element in the open position.

* * * * *